July 28, 1959 J. M. EITEL 2,896,750
TELESCOPING ASSEMBLY
Filed April 20, 1956
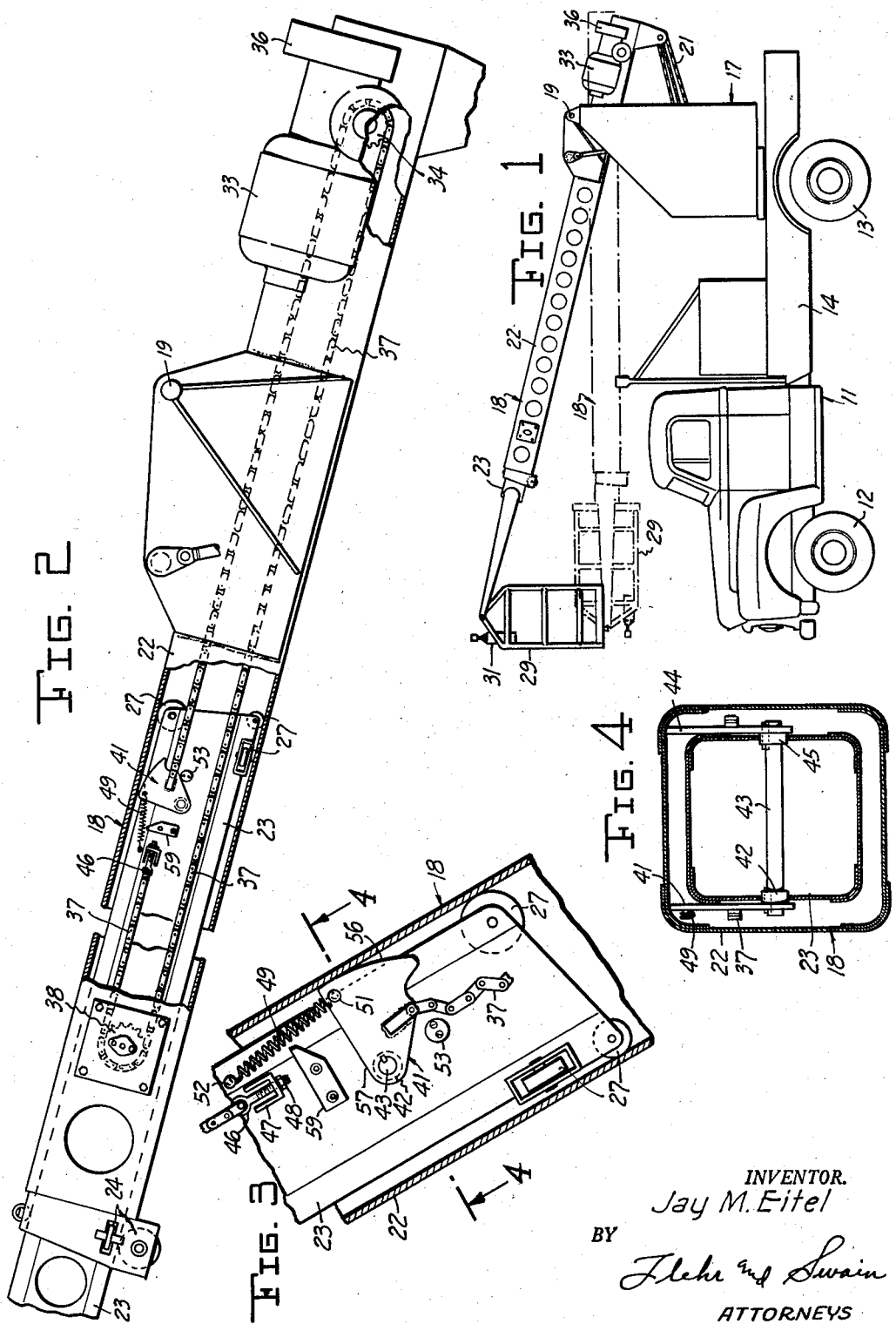
INVENTOR.
Jay M. Eitel
BY
Flehr and Swain
ATTORNEYS

United States Patent Office 2,896,750
Patented July 28, 1959

2,896,750

TELESCOPING ASSEMBLY

Jay M. Eitel, Los Altos, Calif.

Application April 20, 1956, Serial No. 579,690

3 Claims. (Cl. 189—14)

This invention relates generally to telescoping assemblies and more particularly to telescoping assemblies in which safety apparatus has been provided.

In telescoping assemblies such as the extensible boom structure shown in my copending application Serial No. 560,621 filed January 23, 1956, safety means has not been provided to prevent collapse of the boom structure in the event of failure of the means for extending and retracting the boom structure. In lifting equipment such as described in the above copending application, the collapse of the boom structure would cause serious damage to the equipment and injury to the operating personnel.

In general, it is an object of the present invention to provide a telescoping assembly incorporating safety apparatus to prevent collapse of the telescoping assembly in the event of failure of the means for extending and retracting the telescoping assembly.

Another object of the invention is to provide a telescoping assembly of the above character in which the safety apparatus operates automatically.

Another object of the invention is to provide a telescoping assembly of the above character in which the safety apparatus does not effect the normal operation of the telescoping assembly.

Additional objects of the invention will appear from the following description in which the preferred embodiment has been set forth in detail in conjunction with the accompanying drawing.

Referring to the drawing:

Figure 1 is a side elevational view of a lifting equipment incorporating the present invention.

Figure 2 is an enlarged detail view partly in cross section showing a portion of the extensible boom structure and the safety apparatus.

Figure 3 is an enlarged detail view of the safety apparatus showing it in operative condition.

Figure 4 is a cross sectional view taken along the line 4—4 of Figure 3.

In general, the present invention consists of a telescoping assembly in which a cam is pivotally mounted on the inner or telescoping section of the boom and adapted to engage the outer or main section of the boom in the event of failure of the means used for extending and retracting the telescoping assembly. When such a failure occurs, the cam pushes the telescoping section against the main section and thus prevents relative movement of one with respect to the other.

The lifting equipment shown in Figure 1 of the drawing is similar to that disclosed in my copending application Serial No. 560,621 filed January 23, 1956, and consists generally of a self-propelled vehicle 11 having front and rear wheels 12 and 13 and a framework 14. However, if it is desired, the lifting equipment can be mounted on a platform, skids or the like. As described in my copending application, a load supporting structure 17 is mounted on the framework 14 for rotation about a vertical axis. The load supporting structure 17 includes an extensible boom structure 18 which is adapted to be swung about a horizontal axis 19 by means of a chain 21 connected to a gear motor (not shown).

The boom structure 18 consists of an outer or main section 22 and an inner or telescopic section 23. As can be seen from Figure 4, both the main section and telescopic section of the boom structure are of a fabricated construction and are generally square in cross section. As described in my copending application, the main section is provided with a plurality of rollers 24 of various sizes to facilitate movement of the telescoping section axially of the main section 22. The telescoping section 23 is also provided with a plurality of rollers 27 of various sizes to facilitate this axial movement.

A work cage or basket 29 is mounted on the outer end of the telescopic section 23 and carries a control mechanism 31. The portions of my lifting equipment hereinbefore described are substantially identical to that described in my copending application Serial No. 560,621, filed January 23, 1956.

Suitable means is provided for moving the inner or telescopic section 22 axially of the outer or main section 23 and can consist of a gear motor 33 mounted on the main section 22 and driving a sprocket wheel 34. The gear motor is provided with a self-energizing brake 36 such as that described in my aforementioned copending application and serves to maintain the sprocket wheel 34 in a predetermined position when the gear motor 33 is de-energized. The sprocket wheel 34 engages an elongate element or chain 37 which is looped over another sprocket wheel 38 that is rotatably mounted on one side of the main section 22.

One end of the elongate element or chain 37 is fixed to a cam member 41 at a point intermediate the ends of the cam member. The cam member is provided with a hub 42 which is fixed to a shaft 43. Another cam member 44 similar to cam member 41 is provided with a hub 45 which is fixed to the other end of the shaft 43. Both of the hubs 42 and 45 are journalled in the telescopic section 23. Since both cam members 41 and 44 are fixed to the same shaft, it is apparent that they will both move in the same direction at the same time for a purpose hereinafter described. The other end of the elongate member 37 is fastened to a screweye 46 which extends through a bracket 47 fastened to the telescopic section 23. A nut 48 is threaded onto the screweye 46 and provides means for adjusting the tension of the elongate element 37.

Suitable means is provided for urging the cam members 41 and 44 in a counterclockwise direction, as viewed in Figures 2 and 3 for a purpose hereinafter described. Such means can consist of a spring 49 having one end fastened to the upper end of the cam 41 at 51 and having the other end fastened to the telescoping section 23 at 52. A cam release stop 53 is mounted on the telescopic section. The nut 48 is adjusted so that the elongate element or chain causes the cam member 41 to be loaded against the cam release stop 53. This prevents the cams 41 and 44 from engaging the outer or main sections 22 during normal operation of the boom structure.

Cam members 41 and 44 are provided with an arcuate upper surface 56 which is shaped in such a manner that normal slack in the chain 37 will not cause engagement of the cams with the outer or main section 22. The shape of the upper surfaces of the cams must also be such that upon movement of the cams from a cam release stop position as shown in Figure 2 to an engaging position as shown in Figure 4 will cause firm engagement between the telescopic section and the main section as hereinafter described.

A cam stop 59 is mounted on the telescopic section of the boom structure and is adapted to engage the forward edge of the cam 41 to prevent the cams 41 and 44 from passing over center.

Operation of my safety apparatus may now be described as follows: Let it be assumed that the safety apparatus is in the position shown in Figure 2, i.e., the nut 48 has been tightened on the screweye 46 sufficient to load the cam 41 against the cam release stop 53. In this position of the cams 41 and 44 they do not engage the main section 22 and it is apparent that the boom structure can be operated in a conventional manner. The boom structure can be extended or retracted by operation of the gear motor 33 which causes movement of the chain in one direction or the other to cause extension or retraction of the telescopic section 23 with respect to the main section 22.

Now let it be assumed that after the telescopic section 23 has been moved to an extended position and that the elongate element or chain 37 suddenly snaps or breaks. When this occurs, the spring 49 causes counterclockwise rotation of the cams 41 and 44 as viewed in Figure 3 and brings the cams into engagement with the main section 22. At the same time that this is occurring, the telescopic section 23 will begin to fall downwardly or telescope relative to the main section 22. The downward movement of the telescopic section plus the counterclockwise movement of the cams 41 and 44 causes the cams 41 and 44 to firmly engage the main section 22 to push the portion of the telescopic section opposite the cams against the main section 23. This prevents relative movement between sections 22 and 23. Thus, even though the chain used for raising and lowering the telescopic section should break, the telescopic section is held in position to prevent damage to the equipment and injury to any workmen that may be in the basket 29.

The cam members 41 and 44 will normally stop movement of the telescopic section relative to the main section 22 when the forward edges 57 have moved to a position generally at right angles to the axes of sections 22 and 23. However, it is apparent that if the cams 41 and 44 move to a position forward of that shown in Figure 3, the arcuate cam surfaces 56 will still securely engage the main section 22. Cams 41 and 44 cannot pass over center because cam member 41 engages cam stop 59 which limits counterclockwise movement of the cams 41 and 44. Thus, the cams 41 and 44 are maintained in engagement with the main section 22 and cannot pass over center.

It is apparent from the foregoing that I have provided a foolproof safety apparatus which can be used to prevent the collapse of the extensible boom structure in the event of failure of the means for extending and retracting the boom structure. If such an accident should occur, the boom structure can be lowered to make the necessary repairs.

I claim:

1. In a telescoping assembly of the type adapted to be raised and lowered about a horizontal axis and rotated about a vertical axis, an outer boom section, an inner telescoping boom section slidably mounted in said outer section, an elongate flexible element adapted to be driven to impart relative axial movement between the inner and outer boom sections, a cam member pivotally mounted on one of said sections and having a surface adapted to engage the other of said sections, one end of said elongate element being attached to said cam member intermediate the pivotal connection for the cam member and the cam surface and the other end of said elongate element being anchored to said one section, means fastened to said cam member for yieldably urging the cam surface of said cam member into engagement with said other section, and adjustable means affixed to said elongate element to stress the yieldable means and to thereby maintain said cam surface out of engagement with said other section during normal operation of said telescoping assembly, the yieldable means serving to urge said cam member into engagement with said other section to push said one section against said other section upon breaking of the elongate element to prevent collapse of the telescoping assembly.

2. In a telescoping assembly of the type adapted to be raised and lowered about a horizontal axis and rotated about a vertical axis, an outer boom section, an inner telescoping boom section slidably mounted in said outer section, an elongate flexible element adapted to be driven to impart axial movement of the inner section relative to the outer section, a cam member pivotally mounted on the inner section and having an arcuate cam surface adapted to engage the outer section, one end of said elongate element being attached to said cam member intermediate the pivotal connection and the arcuate cam surface and the other end of said elongate element being anchored to said inner section, means fastened to said cam member for yieldably urging the cam surface of said cam member into engagement with said outer section, a cam stop mounted on said inner section, and adjustable means connected to said elongate element to stress the yieldable means and to bias said cam member against said cam stop and to thereby maintain said cam surface out of engagement with the outer section during normal operation of the telescoping assembly, the yieldable means serving to urge the cam surface of said cam member into engagement with said outer section to push said inner section against said outer section upon breaking of the elongate element to thereby prevent collapse of the telescoping assembly.

3. A telescoping assembly as in claim 2 together with an additional cam stop mounted on said inner section, said additional cam stop being adapted to be engaged by said cam member to prevent movement of the cam member over center.

References Cited in the file of this patent

UNITED STATES PATENTS

| | | |
|---|---|---|
| 2,185,828 | Blodgett | Jan. 2, 1940 |
| 2,465,796 | Freeman | Mar. 29, 1949 |
| 2,576,389 | Craighead et al. | Nov. 27, 1951 |
| 2,641,135 | Gosline | June 9, 1953 |